(12) United States Patent
Chen et al.

(10) Patent No.: US 12,374,504 B2
(45) Date of Patent: Jul. 29, 2025

(54) CAPACITOR ASSEMBLY AND DRY-TYPE CAPACITOR

(71) Applicant: Hitachi Energy Ltd, Zürich (CH)

(72) Inventors: Lili Chen, Beijing (CN); Lin Zhang, Beijing (CN)

(73) Assignee: Hitachi Energy Ltd, Zürich (CH)

( * ) Notice: Subject to any disclaimer, the term of this patent is extended or adjusted under 35 U.S.C. 154(b) by 329 days.

(21) Appl. No.: 17/919,851

(22) PCT Filed: Apr. 30, 2020

(86) PCT No.: PCT/CN2020/088109
§ 371 (c)(1),
(2) Date: Oct. 19, 2022

(87) PCT Pub. No.: WO2021/217561
PCT Pub. Date: Nov. 4, 2021

(65) Prior Publication Data
US 2023/0154687 A1 May 18, 2023

(51) Int. Cl.
| | |
|---|---|
| *H01G 4/38* | (2006.01) |
| *H01G 2/08* | (2006.01) |
| *H01G 4/224* | (2006.01) |
| *H01G 4/232* | (2006.01) |

(52) U.S. Cl.
CPC ............ *H01G 4/38* (2013.01); *H01G 4/224* (2013.01); *H01G 4/232* (2013.01); *H01G 2/08* (2013.01)

(58) Field of Classification Search
CPC .......... H01G 4/38; H01G 4/224; H01G 4/232; H01G 2/08

(Continued)

(56) References Cited

U.S. PATENT DOCUMENTS

| | | |
|---|---|---|
| 7,327,555 B2 | 2/2008 | Yeh et al. |
| 9,536,671 B2 | 1/2017 | Ramm et al. |

(Continued)

FOREIGN PATENT DOCUMENTS

| | | |
|---|---|---|
| CN | 202384178 U | 8/2012 |
| CN | 206711772 U | 12/2017 |

(Continued)

OTHER PUBLICATIONS

International Search Report and Written Opinion of the International Searching Authority, PCT/CN2020/088109/, mailed Jan. 26, 2021, 9 pages.

(Continued)

*Primary Examiner* — Arun Ramaswamy
(74) *Attorney, Agent, or Firm* — Sage Patent Group

(57) ABSTRACT

Embodiments of present disclosure relate to a capacitor assembly and a dry-type capacitor. The capacitor assembly includes: a first layer of capacitor elements; a second layer of capacitor elements, wherein the first layer of capacitor elements is stacked on the second layer of capacitor elements; a first busbar comprising a first conductive plate provided with a plurality of holes, wherein the first conductive plate is electrically coupled to the capacitor elements of the first layer via a plurality of connecting elements arranged at the respective holes of the first conductive plate; and a second busbar electrically coupled to the first busbar and including a second conductive plate provided with a plurality of holes, wherein the second conductive plate is electrically coupled to the capacitor elements of the second layer via a plurality of connecting elements arranged at the respective holes of the second conductive plate.

15 Claims, 6 Drawing Sheets

(58) Field of Classification Search
USPC .............................................. 361/328, 306.3
See application file for complete search history.

(56) References Cited

U.S. PATENT DOCUMENTS

| | | | |
|---|---|---|---|
| 10,796,852 | B2 | 10/2020 | Kadomura et al. |
| 2008/0068801 | A1* | 3/2008 | Wilk ..................... H01G 11/18 361/811 |
| 2015/0340157 | A1* | 11/2015 | Wen ................... H05K 7/14329 361/328 |
| 2017/0133154 | A1* | 5/2017 | Sasaki ..................... H01G 4/18 |
| 2018/0062332 | A1* | 3/2018 | Kuboki ............... H01M 50/209 |
| 2018/0211782 | A1 | 7/2018 | Kadomura et al. |
| 2019/0287722 | A1* | 9/2019 | Singh .................... H01G 2/106 |
| 2019/0318878 | A1 | 10/2019 | Owen et al. |

FOREIGN PATENT DOCUMENTS

| | | |
|---|---|---|
| CN | 108063048 A | 5/2018 |
| CN | 108140486 A | 6/2018 |
| CN | 109313983 A | 2/2019 |
| CN | 109979753 A | 7/2019 |
| CN | 209947653 U | 1/2020 |
| EP | 3573127 A1 | 11/2019 |
| JP | 2006324349 A | 11/2006 |
| JP | 2019004068 A | 1/2019 |
| WO | 2014111233 A1 | 7/2014 |
| WO | 2015014769 A1 | 2/2015 |
| WO | WO 2018/014982 A1 | 1/2018 |

OTHER PUBLICATIONS

Hearing Notice, Indian Patent Application No. 202247061090, mailed Apr. 23, 2024, 3 pages.
Office Action, Chinese Patent Application No. 202080100325.0, mailed Sep. 9, 2023, 10 pages.
Office Action, Chinese Patent Application No. 202080100325.0, mailed Dec. 12, 2023, 11 pages.
Extended European Search Report, European Patent Application No. 20933153.7, mailed Jan. 8, 2024, 9 pages.

* cited by examiner

CAPACITOR ASSEMBLY AND DRY-TYPE CAPACITOR

CROSS-REFERENCE TO RELATED APPLICATION

This application is a 35 U.S.C. § 371 national stage application of PCT International Application No. PCT/CN2020/088109 filed on Apr. 30, 2020, the disclosure and content of which is incorporated by reference herein in its entirety.

FIELD

Embodiments of the present disclosure generally relate to the field of capacitors, and more particularly, to a capacitor assembly and a dry-type capacitor comprising the capacitor assembly.

BACKGROUND

A dry-type capacitor typically includes a casing and a plurality of capacitor elements arranged inside the casing and connected to busbars. Each capacitor element may consist of a few layers of insulating film such as polypropylene, which is wound together with aluminium foils. For such capacitor elements, the aluminium foils work as electrodes and the insulating film layers work as dielectric. Alternatively, the capacitor elements may consist of a few layers of metalized plastic film.

Electrical characteristics, e.g. capacitance size, are typical performance parameters taken into account when designing the dry-type capacitor. Such parameters may be dependent of the size or number of the capacitor elements. To obtain a dry-type capacitor having a desired capacitance size and meeting a dimension requirement, the capacitor elements may be stacked in several layers. However, the dry-type capacitor containing two or more layers of capacitor elements may be subjected to a high temperature rise because the heat generated between two adjacent layers of capacitor elements is difficult to be spread out.

International patent publication No. WO2018014982A1 discloses a capacitor unit comprising a first layer of capacitor elements and a second layer of capacitor elements. A first busbar assembly is connected to the capacitor elements of the first layer, and a second busbar assembly is connected to the capacitor elements of the second layer. The first busbar assembly and the second busbar assembly are arranged between the first layer of capacitor elements and the second layer of capacitor elements. Each of the first busbar assembly and the second busbar assembly includes conductive strips. To dissipate the heat from the first busbar assembly and the second busbar assembly, a heat conducting layer is provided between them.

However, in WO2018014982A1, the provision of the heat conducting layer between the first busbar assembly and the second busbar assembly would make the construction of the capacitor unit more complicated and result in a high material cost of the capacitor unit. In addition, the current distribution across the conductive strips of the first busbar assembly or the second busbar assembly may be non-uniform, resulting in deterioration of the electrical characteristics of the capacitor unit. Further, in a process of soldering the first busbar assembly or the second busbar assembly to the capacitor elements, it is difficult to position the soldering points precisely and thus additional tools or fixtures are needed to fix the soldering position.

Thus, there is a need for an improved solution for dissipating the heat generated between two adjacent layers of capacitor elements.

SUMMARY

In view of the foregoing problems, a general object of the present disclosure is to provide a capacitor assembly which solves or at least mitigates the problem of the prior art.

In a first aspect of the present disclosure, example embodiments of the present disclosure provide a capacitor assembly comprising: a first layer of capacitor elements; a second layer of capacitor elements, wherein the first layer of capacitor elements is stacked on the second layer of capacitor elements; a first busbar comprising a first conductive plate provided with a plurality of holes, wherein the first conductive plate is electrically coupled to the capacitor elements of the first layer via a plurality of connecting elements arranged at the respective holes of the first conductive plate; and a second busbar electrically coupled to the first busbar and comprising a second conductive plate provided with a plurality of holes, wherein the second conductive plate is electrically coupled to the capacitor elements of the second layer via a plurality of connecting elements arranged at the respective holes of the second conductive plate, and wherein the first and second conductive plates are arranged between the first layer of capacitor elements and the second layer of capacitor elements.

According to some embodiments of the present disclosure, the heat generated between the first and second layers of capacitor elements may be dissipated by the first and second conductive plates. Compared with the conventional busbar assembly consisting of conductive strips, the first and second conductive plates may provide improved heat dissipation efficiency. Thus, no additional heat conducting layer is needed in the capacitor assembly any more, reducing the material cost of the capacitor assembly. In addition, the holes manufactured on the first and second conductive plates are suitable for positioning the soldering points and thus no additional tool or fixture is needed to fix the soldering position. Furthermore, the current distribution across the first and second conductive plates is more uniform than the conventional busbar assembly consisting of conductive strips, improving the electrical characteristics of the capacitor assembly.

In some embodiments, the connecting elements are soldered on the first and second conductive plates and soldered to the capacitor elements of the first and second layers at the respective holes.

In some embodiments, each of the connecting elements comprises a braid made from a plurality of wires.

In some embodiments, the connecting elements are formed in the respective holes and soldered to the respective capacitor elements of the first and second layers.

In some embodiments, the first busbar further comprises a first pair of skirts arranged along opposite sides of the first conductive plate and at least partially covering the height of the capacitor elements of the first layer, and the second busbar further comprises a second pair of skirts arranged along opposite sides of the second conductive plate and at least partially covering the height of the capacitor elements of the second layer.

In some embodiments, each of the skirts covers about a half of the height of the respective capacitor elements.

In some embodiments, the first pair of skirts are aligned with the second pair of skirts respectively.

In some embodiments, the second busbar is electrically coupled to the first busbar via at least one additional connecting element soldered on the first pair of skirts and the second pair of skirts.

In some embodiments, the at least one additional connecting element comprises braids each made from a plurality of wires.

In some embodiments, the first conductive plate is in contact with the second conductive plate.

In some embodiments, the capacitor assembly further comprises: a third busbar arranged opposite to the first busbar with respect to the first layer of capacitor elements and coupled to the capacitor elements of the first layer; and a fourth busbar arranged opposite to the second busbar with respect to the second layer of capacitor elements and coupled to the capacitor elements of the second layer.

In some embodiments, the third busbar comprises a third conductive plate provided with a plurality of holes, and the third conductive plate is electrically coupled to the capacitor elements of the first layer via a plurality of connecting elements arranged at the respective holes of the third conductive plate.

In some embodiments, the third busbar further comprises a first bending part arranged at an end of the third conductive plate, and the capacitor assembly further comprises at least one first conductive terminal coupled to the first bending per.

In some embodiments, the fourth busbar comprises a fourth conductive plate provided with a plurality of holes, and the fourth conductive plate is electrically coupled to the capacitor elements of the second layer via a plurality of connecting elements arranged at the respective holes of the fourth conductive plate.

In some embodiments, the fourth busbar further comprises a second bending part arranged at an end of the fourth conductive plate, and the capacitor assembly further comprises at least one second conductive terminal coupled to the second bending part.

In some embodiments, the capacitor assembly further comprises a positioning board configured to align the capacitor elements of the first layer with the capacitor elements of the second layer.

In some embodiments, the capacitor assembly comprises three or more layers of capacitor elements stacked with each other, and the three or more layers of capacitor elements comprise the first layer of capacitor elements and the second layer of capacitor elements.

In a second aspect of the present disclosure, example embodiments of the present disclosure provide a dry-type capacitor comprising a capacitor assembly according to the first aspect of the present disclosure.

It is to be understood that the Summary section is not intended to identify key or essential features of embodiments of the present disclosure, nor is it intended to be used to limit the scope of the present disclosure. Other features of the present disclosure will become easily comprehensible through the following description.

DESCRIPTION OF DRAWINGS

Through the following detailed descriptions with reference to the accompanying drawings, the above and other objectives, features and advantages of the example embodiments disclosed herein will become more comprehensible. In the drawings, several example embodiments disclosed herein will be illustrated in an example and in a non-limiting manner, wherein.

Throughout the drawings, the same or similar reference symbols are used to indicate the same or similar elements.

DETAILED DESCRIPTION OF EMBODIMENTS

Figure 1:
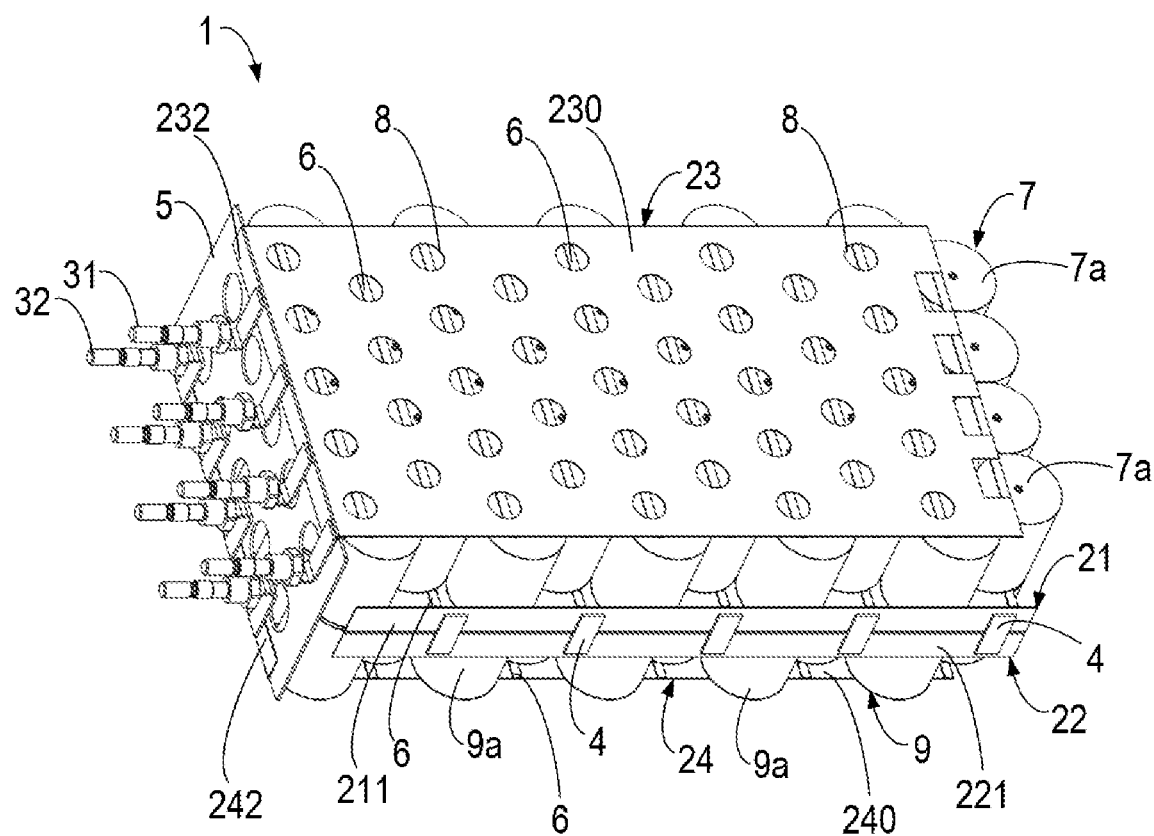
FIG. 1 is a perspective view of a capacitor assembly in accordance with an embodiment of the present disclosure.

Principles of the present disclosure will now be described with reference to several example embodiments shown in the drawings. Though example embodiments of the present disclosure are illustrated in the drawings, it is to be understood that the embodiments are described only to facilitate those skilled in the art in better understanding and thereby achieving the present disclosure, rather than to limit the scope of the disclosure in any manner.

The term comprises" or includes and its variants are to be read as open terms that mean includes, but is not limited to. The term or is to be read as and/or unless the context clearly indicates otherwise. The term based on is to be read as based at least in part on. The term being operable to is to mean a function, an action, a motion or a state can be achieved by an operation induced by a user or an external mechanism. The term one embodiment and an embodiment are to be read as at least one embodiment. The term another embodiment is to be read as at least one other embodiment. The terms first, second, and the like may refer to different or same objects. Other definitions, explicit and implicit, may be included below. A definition of a term is consistent throughout the description unless the context clearly indicates otherwise.

According to embodiments of the present disclosure, first and second conductive plates provided with holes may dissipate the heat generated between first and second layers of capacitor elements with improved heat dissipation efficiency. The above idea may be implemented in various manners, as will be described in detail in the following paragraphs.

The present disclosure relates to a capacitor assembly comprising two layers of capacitor elements arranged in a stacked manner, i.e., a first layer of capacitor elements and a second layer of capacitor elements. It is to be understood that the capacitor assembly may comprise exactly two layers of capacitor elements, or more than two layers of capacitor elements, in which case the structure described below may be applied between each adjacent pair of layers of capacitor elements.

According to embodiments of the present disclosure, each layer of capacitor elements comprises at least one, but typically a plurality of rows and a plurality of columns of capacitor elements. Each of the capacitor elements may be of a cylinder shape or other shapes. In an embodiment, each capacitor element includes a few layers of insulating film such as polypropylene, which is wound together with aluminium foils. For such capacitor elements, the aluminium foils work as electrodes and the insulating film layers work as dielectric. In another embodiment, the capacitor elements may consist of a few layers of metalized plastic film. In other embodiments, the capacitor elements may be of other constructions known or available in future. The scope of the present disclosure is not intended to be limited in this respect.

Figure 2:
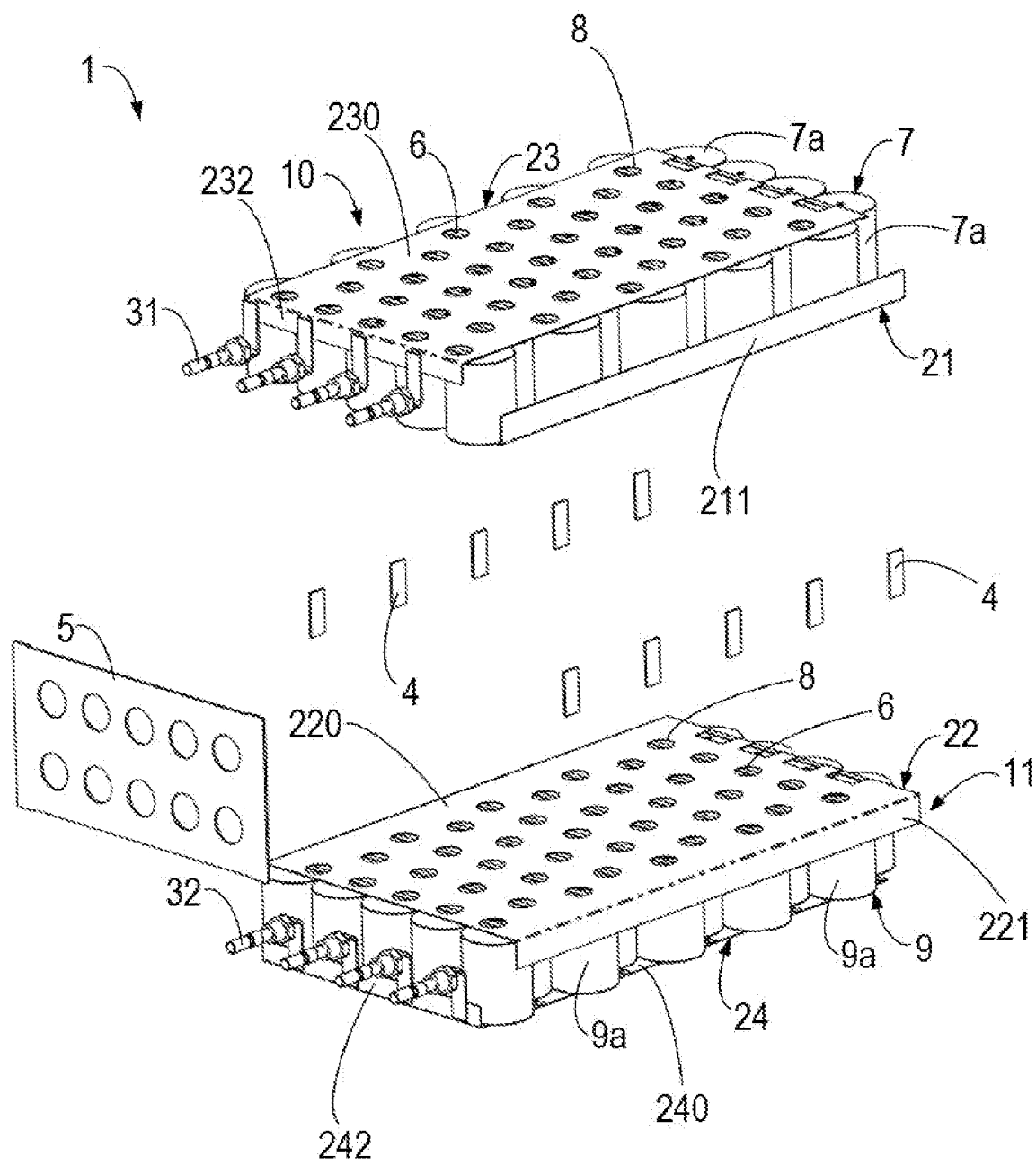
FIG. 2 is an exploded view of the capacitor assembly as shown in FIG. 1, illustrating an upper stack and a lower stack.

Hereinafter, the principles of the present disclosure will be described in detail with reference to FIGS. 1-7. Referring to FIGS. 1 and 2 first, FIG. 1 is a perspective view of a capacitor assembly 1 in accordance with an embodiment of the present disclosure, and FIG. 2 is an exploded view of the capacitor assembly 1 as shown in FIG. 1. As shown, the capacitor assembly 1 described herein generally includes an upper stack 10 and a lower stack 11. The upper stack 10 is arranged over and electrically coupled to the lower stack 11.

In an embodiment, the upper stack 10 includes a first layer 7 of capacitor elements 7a, a first busbar 21, and a third busbar 23. The capacitor elements 7a are arranged in a plurality of rows and a plurality of columns between the first busbar 21 and the third busbar 23. The first busbar 21 is electrically coupled to one of positive and negative electrodes of each of the capacitor elements 7a. The third busbar 23 is electrically coupled to the other one of the positive and negative electrodes of each of the capacitor elements 7a. One of the busbars 21 and 23 may lead current to the capacitor elements 7a of the first layer 7, and the other one of the busbars 21 and 23 may lead current from the capacitor elements 7a of the first layer 7.

In an embodiment, the lower stack 11 includes a second layer 9 of capacitor elements 9a, a second busbar 22, and a fourth busbar 24. The second busbar 22 is electrically coupled to the first busbar 21. The capacitor elements 9a are arranged in a plurality of rows and a plurality of columns between the second busbar 22 and the fourth busbar 24. The second busbar 22 is electrically coupled to one of positive and negative electrodes of each of the capacitor elements 9a. The fourth busbar 24 is electrically coupled to the other one of the positive and negative electrodes of each of the capacitor elements 9a. One of the busbars 22 and 24 may lead current to the capacitor elements 9a of the second layer 9, and the other one of the busbars 22 and 24 may lead current from the capacitor elements 9a of the second layer 9. According to embodiments of the present disclosure, the capacitor elements 7a of the first layer 7 may be connected in parallel or in series with the capacitor elements 9a of the second layer 9 according to different requirements.

In some embodiments, the busbars 21, 22, 23, and 24 may be made of copper. In other embodiments, the busbars 21, 22, 23, and 24 may be made of other available materials. The scope of the present disclosure is not intended to be limited to the implementations as described herein.

Figure 3:
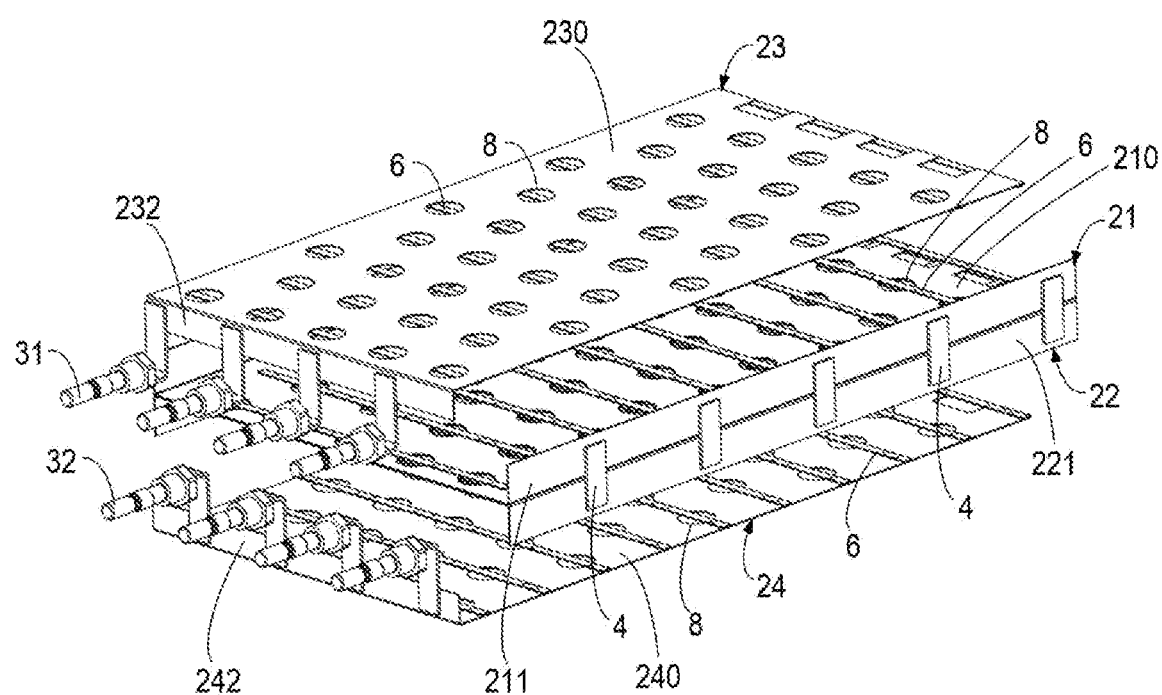
FIG. 3 schematically illustrates a relative arrangement of first, second, third, and fourth busbars of the capacitor assembly as shown in FIG. 1.

In the following, the example construction of the busbars 21, 22, 23, and 24 will be further described in detail in conjunction with FIGS. 3-7. In FIG. 3, the first layer 7 of capacitor elements 7a and the second layer 9 of capacitor elements 9a are omitted so as to clearly present the construction and the relative arrangement of the busbars 21, 22, 23, and 24.

In an embodiment, as shown in FIGS. 1-3, the first busbar 21 includes a first conductive plate 210 provided with a plurality of holes 8 corresponding to the capacitor elements 7a of the first layer 7. The first conductive plate 210 is arranged between the first layer 7 of capacitor elements 7a and the second layer 9 of capacitor elements 9a. The holes 8 are suitable for determining the soldering points of the respective capacitor elements 7a. For example, the plurality of holes 8 may be arranged to be generally aligned with the capacitor elements 7a of the first layer 7. A plurality of connecting elements 6 are arranged at the respective holes 8 of the first conductive plate 210. With such an arrangement, each of the capacitor elements 7a may be electrically coupled to the first conductive plate 210 via the respective connecting element 6 at the respective hole 8.

In an embodiment, the connecting elements 6 are soldered on the first conductive plate 210. Each of the connecting elements 6 extends across the respective hole 8 and soldered to the respective capacitor element 7a. In an example, each of the connecting elements 6 may include a braid made from a plurality of wires, such as tinned copper wires or of other materials. With such an arrangement, the current may flow smoothly between the braids and the respective capacitor elements 7a. In some cases, the braids may be soldered on the first conductive plate 210 separately. However, in a case where the holes 8 are arranged in rows, the braids corresponding to the holes 8 in each row may be formed by a long braid soldered on the first conductive plate 210, as shown in FIG. 3. In other examples, each of the connecting elements 6 may be in other form, such as a copper sheet.

In some embodiments, the connecting elements 6 may be directly formed in the respective holes 8 and soldered to the respective capacitor elements 7a. For example, the connecting elements 6 and the first conductive plate 210 may be made from one and the same copper plate by a laser cutting machine. In other embodiments, the connecting elements 6 may be arranged at the respective holes 8 of the first conductive plate 210 in other manners. The scope of the present disclosure is not intended to be limited to the implementations as described herein.

The second busbar 22 may have the similar structure as the first busbar 21. Hereinafter, the specific structure of the second busbar 22 will be described in detail with reference to FIGS. 4-6.

Figure 4:
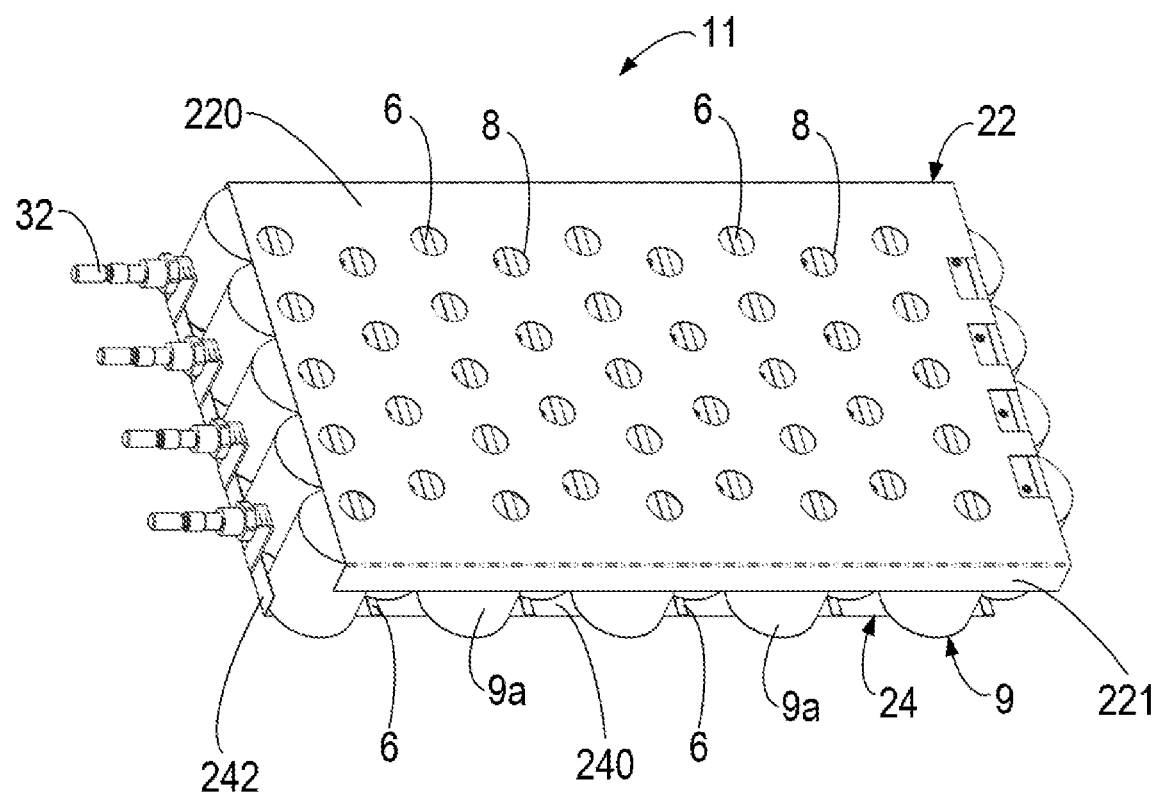
FIG. 4 is a perspective view of the lower stack of the capacitor assembly as shown in FIG. 2.
Figure 5:
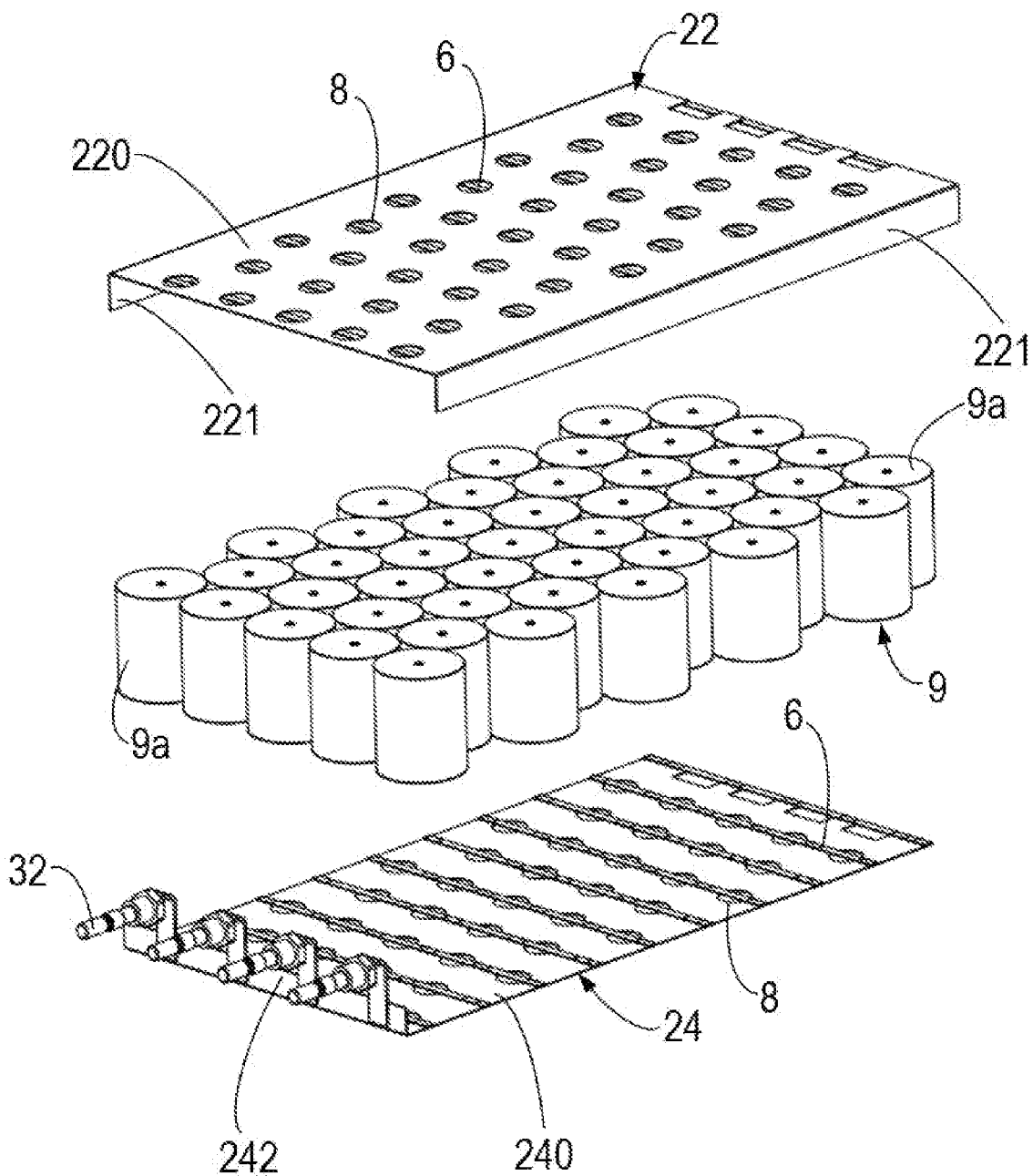
FIG. 5 is an exploded view of the lower stack as shown in FIG. 4.
Figure 6:
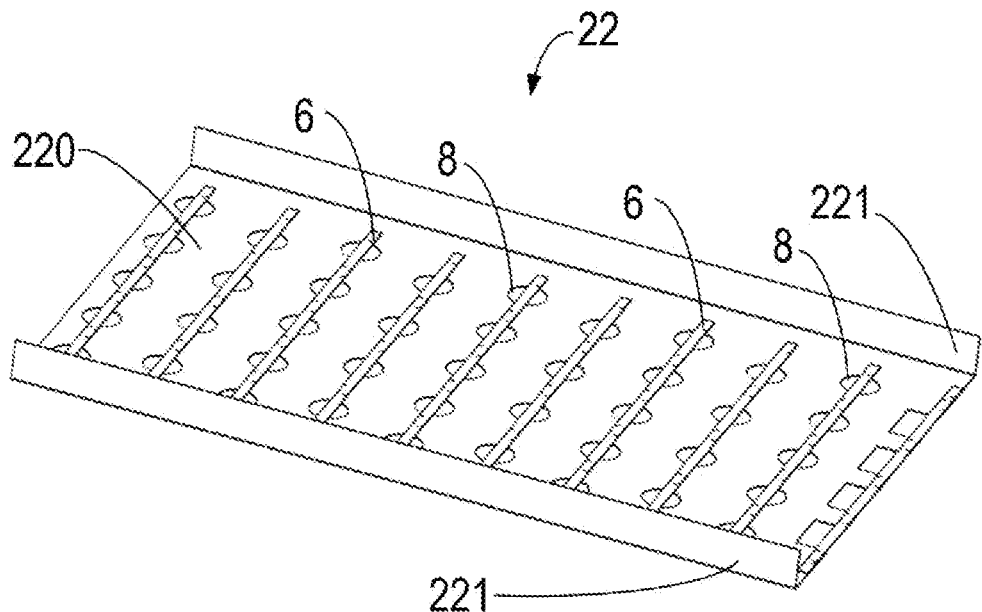
FIG. 6 is a perspective view of a second busbar of the lower stack as shown in FIG. 5.
Figure 7:
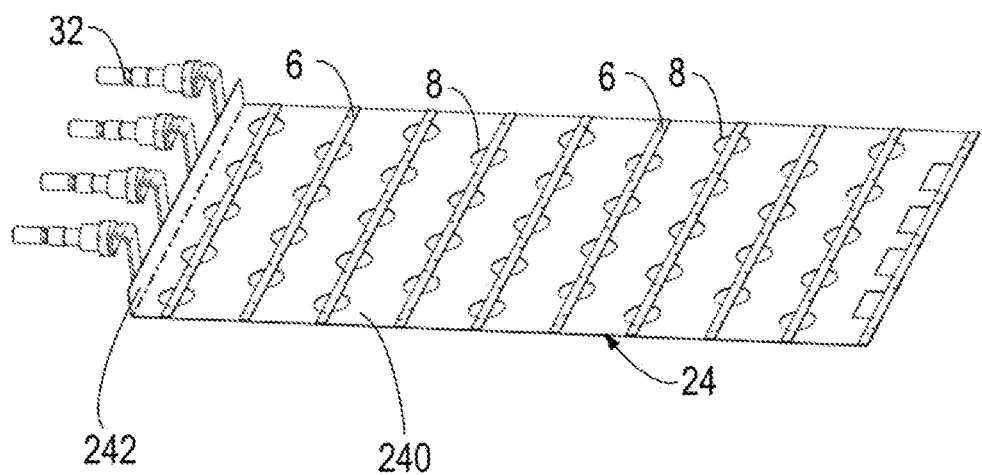
FIG. 7 is a perspective view of a fourth busbar of the lower stack as shown in FIG. 5.

In an embodiment, as shown in FIGS. 4-6, the second busbar 22 includes a second conductive plate 220 provided with a plurality of holes 8 corresponding to the capacitor elements 9a of the second layer 9. The second conductive plate 220 is arranged between the first layer 7 of capacitor elements 7a and the second layer 9 of capacitor elements 9a. The holes 8 are suitable for determining the soldering points of the respective capacitor elements 9a. For example, the plurality of holes 8 may be arranged to be generally aligned with the capacitor elements 9a of the second layer 9. A plurality of connecting elements 6 are arranged at the respective holes 8 of the second conductive plate 220. With such an arrangement, each of the capacitor elements 9a may be electrically coupled to the second conductive plate 220 via the respective connecting element 6 at the respective hole 8.

In an embodiment, the connecting elements 6 are soldered on the second conductive plate 220. Each of the connecting elements 6 extends across the respective hole 8 and soldered to the respective capacitor element 9a. In an example, each of the connecting elements 6 may include a braid made from a plurality of wires, such as tinned copper wires or of other materials. In some cases, the braids may be soldered on the second conductive plate 220 separately. However, in a case where the holes 8 are arranged in rows, the braids corresponding to the holes 8 in each row may be formed by a long braid soldered on the second conductive plate 220, as shown in FIG. 6. In other examples, each of the connecting elements 6 may be in other form, such as a copper sheet.

In some embodiments, the connecting elements 6 may be directly formed in the respective holes 8 and soldered to the respective capacitor elements 9a. For example, the connecting elements 6 and the second conductive plate 220 may be made from one and the same copper plate by a laser cutting machine. In other embodiments, the connecting elements 6 may be arranged at the respective holes 8 of the second conductive plate 220 in other manners. The scope of the present disclosure is not intended to be limited to the implementations as described herein.

According to embodiments of the present disclosure, the heat generated between the two layers of capacitor elements 7a and 9a may be dissipated by the conductive plates 210 and 220. Compared with the conventional busbar assembly consisting of conductive strips, the conductive plates 210 and 220 may provide improved heat dissipation efficiency, reducing the temperature inside the capacitor assembly 1. Moreover, the holes 8 manufactured on the conductive plates 210 and 220 are suitable for positioning the soldering points of the capacitor elements 7a and 9a and thus no additional tool or fixture is needed to fix the soldering position. Furthermore, the current distribution across the conductive plates 210 and 220 is more uniform than the conventional busbar assembly consisting of conductive strips, improving the electrical characteristics of the capacitor assembly 1.

According to embodiments of the present disclosure, to further improve the heat dissipation efficiency of the capacitor assembly 1, the busbars 21 and 22 may be provided with skirts for conducting the heat further away from the conductive plates 210 and 220.

In an embodiment, as shown in FIGS. 1-3, the first busbar 21 further includes a first pair of skirts 211. The skirts 211 are arranged along opposite sides of the first conductive plate 210 and partially cover the height of the capacitor elements 7a of the first layer 7. The skirts 211 may be formed on opposite sides of the first conductive plate 210 through a simple bending process or other available processes. In an example, each of the skirts 211 may cover about a half of the height of the capacitor elements 7a. In another example, each of the skirts 211 may cover less than a half of the height of the capacitor elements 7a. In a further example, each of the skirts 211 may cover more than a half of the height of the capacitor elements 7a. In some examples, each of the skirts 211 may substantially cover the entire height of the capacitor elements 7a.

In an embodiment, as shown in FIGS. 4-6, the second busbar 22 further includes a second pair of skirts 221. The skirts 221 are arranged along opposite sides of the second conductive plate 220 and partially cover the height of the capacitor elements 9a of the second layer 9. The skirts 221 may be formed on opposite sides of the second conductive plate 220 through a simple bending process or other available processes. In an example, each of the skirts 221 may cover about a half of the height of the capacitor elements 9a. In another example, each of the skirts 221 may cover less than a half of the height of the capacitor elements 9a. In a further example, each of the skirts 221 may cover more than a half of the height of the capacitor elements 9a. In some examples, each of the skirts 221 may substantially cover the entire height of the capacitor elements 9a.

With the skirts 211 and 221 arranged on opposite sides of the conductive plates 210 and 220, the heat generated between the first layer 7 of capacitor elements 7a and the second layer 9 of capacitor elements 9a may be conducted away from the conductive plates 210 and 220, further improving the heat dissipation efficiency of the capacitor assembly 1.

In some embodiments, as shown in FIG. 1, the first pair of skirts 211 are aligned with the second pair of skirts 221 respectively. In other words, each of the skirts 211 is substantially coplanar with the corresponding skirt 221. To achieve the electrical coupling between the first busbar 21 and the second busbar 22, additional connecting elements 4 are soldered between the skirts 211 and 221. In an example, each of the additional connecting elements 4 includes a braid made from a plurality of wires, such as tinned copper wires or of other materials. In other examples, each of the additional connecting elements 4 may be in other form, such as a copper sheet. The scope of the present disclosure is not intended to be limited in this respect.

In some embodiments, as shown in FIGS. 1-3, the number of the additional connecting elements 4 may be ten. On each side of the capacitor assembly 1, five additional connecting elements 4 are evenly soldered on the skirts 211 and 221 so as to achieve the electrical coupling between the first busbar 21 and the second busbar 22. The sectional area of each additional connecting element 4 may be approximately 50 $mm^2$. Such an arrangement may ensure a good electrical connection between the first busbar 21 and the second busbar 22 and avoid the heat concentration on the skirts 211 and 221. In other embodiments, the number of the additional connecting elements 4 may be more or less than ten. The scope of the present disclosure is not intended to be limited in this respect.

In some embodiments, as shown in FIGS. 1 and 3, the first conductive plate 210 is in contact with the second conductive plate 220. In other embodiments, one or more additional layers, such as heat conducting layers, may be arranged between the first and second conductive plates 210, 220.

In some embodiments, as shown in FIGS. 1-3, the third busbar 23 includes a third conductive plate 230 provided with a plurality of holes 8 corresponding to the capacitor elements 7a of the first layer 7. The plurality of holes 8 may be arranged to be generally aligned with the capacitor elements 7a of the first layer 7. A plurality of connecting elements 6 are arranged at the respective holes 8 of the third conductive plate 230. With such an arrangement, each of the capacitor elements 7a may be electrically coupled to the third conductive plate 230 via the respective connecting element 6 at the respective hole 8. The construction and arrangement of the connecting elements 6 on the third conductive plate 230 may be similar to those of the connecting elements 6 on the first and second conductive plates 210, 220, and would not be described further herein.

In some embodiments, as shown in FIGS. 1-3, the third busbar 23 further includes a first bending part 232 arranged at an end of the third conductive plate 230. The first bending part 232 may be formed on the third conductive plate 230 through a simple bending process or other available processes. The first bending part 232 is adapted to couple at least one first conductive terminal 31, such as two, three, four or more.

In some embodiments, as shown in FIGS. 3-5 and 7, the fourth busbar 24 includes a fourth conductive plate 240 provided with a plurality of holes 8 corresponding to the capacitor elements 9a of the second layer 9. The plurality of holes 8 may be arranged to be generally aligned with the capacitor elements 9a of the second layer 9. A plurality of connecting elements 6 are arranged at the respective holes 8 of the fourth conductive plate 240. With such an arrangement, each of the capacitor elements 9a may be electrically coupled to the fourth conductive plate 240 via the respective connecting element 6 at the respective hole 8. Likewise, the construction and arrangement of the connecting elements 6 on the fourth conductive plate 240 may be similar to those of the connecting elements 6 on the first and second conductive plates 210, 220, and would not be described in detail here any more.

In some embodiments, as shown in FIGS. 3-5 and 7, the fourth busbar 24 further includes a second bending part 242 arranged at an end of the fourth conductive plate 240. The second bending part 242 may be formed on the fourth conductive plate 240 through a simple bending process or other available processes. The second bending part 242 is adapted to couple at least one second conductive terminal 32, such as two, three, four or more.

According to embodiments of the present disclosure, the holes 8 on the busbars 21, 22, 23, and 24 are easy to be manufactured by a laser cutting machine. In other embodiments, the holes 8 may be manufactured on the busbars 21, 22, 23, and 24 in other manners. The scope of the present disclosure is not intended to be limited in this respect.

In some embodiments, as shown in FIGS. 1 and 2, the capacitor assembly 1 further includes a positioning board 5 configured to align the capacitor elements 7*a* of the first layer 7 with the capacitor elements 9*a* of the second layer 9.

Although embodiments of the present disclosure are described herein with respect to the capacitor assembly 1 including two layers of capacitor elements 7*a* and 9*a*, it is to be understood that the capacitor assembly 1 may include more than two layers of capacitor elements, such as three or more layers of capacitor elements stacked with each other. In the case, the first and second busbars 21, 22 may be arranged between each adjacent pair of layers of capacitor elements.

Embodiments of the present disclosure further provide a dry-type capacitor comprising a casing and a capacitor assembly 1 as discussed above with reference to FIGS. 1-7. The capacitor assembly 1 is arranged inside the casing.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

What is claimed is:

1. A capacitor assembly comprising:
a first layer of capacitor elements;
a second layer of capacitor elements, wherein the first layer of capacitor elements is stacked on the second layer of capacitor elements;
a first busbar comprising a first conductive plate provided with a plurality of holes, wherein the first conductive plate is electrically coupled to the capacitor elements of the first layer via a plurality of connecting elements arranged at the respective holes of the first conductive plate; and
a second busbar electrically coupled to the first busbar and comprising a second conductive plate provided with a plurality of holes, wherein the second conductive plate is electrically coupled to the capacitor elements of the second layer via a plurality of connecting elements arranged at the respective holes of the second conductive plate, and wherein the first and second conductive plates are arranged between the first layer of capacitor elements and the second layer of capacitor elements,
wherein the first busbar further comprises a first pair of skirts arranged along opposite sides of the first conductive plate and at least partially covering the height of the capacitor elements of the first layer, and
wherein the second busbar further comprises a second pair of skirts arranged along opposite sides of the second conductive plate and at least partially covering the height of the capacitor elements of the second layer,
wherein the first pair of skirts are aligned with the second pair of skirts respectively, and
wherein the second busbar is electrically coupled to the first busbar via at least one additional connecting element soldered on the first pair of skirts and the second pair of skirts.

2. The capacitor assembly according to claim 1, wherein the connecting elements are soldered on the first and second conductive plates and soldered to the capacitor elements of the first and second layers at the respective holes.

3. The capacitor assembly according to claim 2, wherein each of the connecting elements comprises a braid made from a plurality of wires.

4. The capacitor assembly according to claim 1, wherein the connecting elements are formed in the respective holes and soldered to the respective capacitor elements of the first and second layers.

5. The capacitor assembly according to claim 1, wherein each of the skirts covers about a half of the height of the respective capacitor elements.

6. The capacitor assembly according to claim 1, wherein the at least one additional connecting element comprises braids each made from a plurality of wires.

7. The capacitor assembly according to claim 1, wherein the first conductive plate is in contact with the second conductive plate.

8. The capacitor assembly according to claim 1, further comprising:
a third busbar arranged opposite to the first busbar with respect to the first layer of capacitor elements and coupled to the capacitor elements of the first layer; and
a fourth busbar arranged opposite to the second busbar with respect to the second layer of capacitor elements and coupled to the capacitor elements of the second layer.

9. The capacitor assembly according to claim 8, wherein the third busbar comprises a third conductive plate provided with a plurality of holes, and wherein the third conductive plate is electrically coupled to the capacitor elements of the first layer via a plurality of connecting elements arranged at the respective holes of the third conductive plate.

10. The capacitor assembly according to claim 9, wherein the third busbar further comprises a first bending part arranged at an end of the third conductive plate, and wherein the capacitor assembly further comprises at least one first conductive terminal coupled to the first bending part.

11. The capacitor assembly according to claim 8, wherein the fourth busbar comprises a fourth conductive plate provided with a plurality of holes, and wherein the fourth conductive plate is electrically coupled to the capacitor elements of the second layer via a plurality of connecting elements arranged at the respective holes of the fourth conductive plate.

12. The capacitor assembly according to claim 11, wherein the fourth busbar further comprises a second bending part arranged at an end of the fourth conductive plate, and wherein the capacitor assembly further comprises at least one second conductive terminal coupled to the second bending part.

13. The capacitor assembly according to claim 1, further comprising a positioning board configured to align the capacitor elements of the first layer with the capacitor elements of the second layer.

14. The capacitor assembly according to claim 1, wherein the capacitor assembly comprises three or more layers of capacitor elements stacked with each other, and the three or more layers of capacitor elements comprise the first layer of capacitor elements and the second layer of capacitor elements.

15. A dry-type capacitor comprising a capacitor assembly comprising:

a first layer of capacitor elements;

a second layer of capacitor elements, wherein the first layer of capacitor elements is stacked on the second layer of capacitor elements;

a first busbar comprising a first conductive plate provided with a plurality of holes, wherein the first conductive plate is electrically coupled to the capacitor elements of the first layer via a plurality of connecting elements arranged at the respective holes of the first conductive plate; and a second busbar electrically coupled to the first busbar and comprising a second conductive plate provided with a plurality of holes, wherein the second conductive plate is electrically coupled to the capacitor elements of the second layer via a plurality of connecting elements arranged at the respective holes of the second conductive plate, and wherein the first and second conductive plates are arranged between the first layer of capacitor elements and the second layer of capacitor elements, wherein the first busbar further comprises a first pair of skirts arranged along opposite sides of the first conductive plate and at least partially covering the height of the capacitor elements of the first layer, and wherein the second busbar further comprises a second pair of skirts arranged along opposite sides of the second conductive plate and at least partially covering the height of the capacitor elements of the second layer, wherein the first pair of skirts are aligned with the second pair of skirts respectively, and wherein the at least one additional connecting element comprises braids each made from a plurality of wires.

* * * * *